United States Patent
Riddle et al.

(10) Patent No.: US 6,827,042 B1
(45) Date of Patent: Dec. 7, 2004

(54) ELEPHANT INCURSION PREVENTION APPARATUS

(75) Inventors: Scott W. Riddle, 233 Pumpkin Center Cir., Quitman, AR (US) 72058; Lois Elizabeth Little Rasmussen, Portland, OR (US)

(73) Assignee: Scott W. Riddle, Quitman, KS (US)

( * ) Notice: Subject to any disclaimer, the term of this patent is extended or adjusted under 35 U.S.C. 154(b) by 0 days.

(21) Appl. No.: 10/625,275

(22) Filed: Jul. 23, 2003

Related U.S. Application Data (60) Provisional application No. 60/479,001, filed on Jun. 17, 2003.

(51) Int. Cl.[7] ............................. A01K 3/00; E01B 5/18
(52) U.S. Cl. ........................... 119/712; 256/16; 256/17
(58) Field of Search ............................... 119/712, 843, 119/905; 256/14, 16, 17

(56) References Cited

U.S. PATENT DOCUMENTS

| | | |
|---|---|---|
| 848,374 A | 3/1907 | Jenks |
| 1,254,072 A | 1/1918 | Russell |
| 1,406,343 A | 2/1922 | Carden |
| 1,518,772 A | 12/1924 | Carden |
| 1,563,368 A | 12/1925 | Gibson |
| 1,618,555 A | 2/1927 | Shaw |
| 1,769,486 A * | 7/1930 | Bjork .......................... 256/18 |
| 1,807,130 A * | 5/1931 | Osako ......................... 256/14 |
| 2,023,835 A | 12/1935 | Heiken |
| 2,591,220 A * | 4/1952 | Welter ......................... 256/17 |
| 3,491,480 A | 1/1970 | Nickel et al. |
| 4,949,216 A | 8/1990 | Djukastein |
| 4,969,418 A | 11/1990 | Jones |

* cited by examiner

Primary Examiner—Michael J. Carone
Assistant Examiner—Elizabeth Shaw
(74) Attorney, Agent, or Firm—J. Charles Dougherty (57) ABSTRACT

A device to prevent incursion of wild elephants into human populated areas, and thereby protect the lives of both wild elephants and humans living in close proximity to elephant refuges, is disclosed. The device incorporates a series of rollers that discourage an elephant from crossing the device. Multiple units may be linked together to form a barrier of any desired length. The border on the frame of each unit is protected by a guard that pinches the foot of an elephant attempting to cross over on the butted edges where two units meet. Alterative embodiments of the device may include roller protrusions, a chemical repellent dispersant, and an electrified conductor wire.

23 Claims, 4 Drawing Sheets

ELEPHANT INCURSION PREVENTION APPARATUS

CROSS-REFERENCE TO RELATED APPLICATIONS

The present application claims the benefit of U.S. provisional patent application No. 60/479,001, filed Jun. 17, 2003, entitled "Elephant Incursion Prevention Apparatus," and such application is hereby incorporated by reference herein.

BACKGROUND OF THE INVENTION

The present invention relates to devices designed to prevent animals from entering an area, and in particular relates to devices to prevent wild elephants from leaving an elephant sanctuary or reserve and entering an area of human population or cultivated croplands.

The rapid decline of wild elephant populations throughout the world is a well-documented phenomenon. In India, which contains the world's largest concentration of wild Asian elephants, there remain only an estimated 30,000 elephants in the wild. This tiny population is declining at an alarming rate, making the Asian elephant an ever-increasingly highly endangered species. The two principal reasons for the decline of wild elephant populations are poaching and loss of habitat. While problems with poachers often garner the news headlines, it is the problem of loss of habitat that presents the greater long-term danger to the existence of wild elephants in India and other parts of the world. Those areas where wild elephants remain also are the areas of the world where human populations are increasing the most rapidly. India, for example, is experiencing a meteoric increase in its human population; this inevitably leads to the expansion of humans further and further into wild elephant areas as people clear new croplands.

The increase in human habitation in wild elephant areas, coupled with the loss of habitat and concomitant loss of food and water resources for the elephants, has led to a catastrophic clash between human and wild elephant populations, which the elephants are losing. The danger to both wild elephants and humans living in close proximity are greatly exacerbated when the habitat area available to wild elephants is reduced. An average adult elephant requires 200 kilograms of food and 200 liters of fresh water per day. As the elephant's wild territory shrinks, elephants have increasingly turned to raiding crops and food stores maintained by humans in nearby areas. Humans caught in the path of these desperate elephants may be injured or killed. For example, in the State of Chhattisgarh, in far northwestern India along the Pakistani border, wild elephants killed at least 34 people in the period of 2000–2003. In the State of Assam, in northeast India, more than 100 people were trampled to death by elephants during this same period. Assam contains the largest population of wild elephants of any Indian state.

In order to protect their crops and the lives of their families, farmers in the areas near wild elephant populations have turned to killing the elephants who raid their lands. The problem is rapidly increasing in severity. In the state of Assam, for example, only one elephant was killed by farmers in 2000, but 17 were killed by farmers in 2002. Most of the elephants killed by these farmers were poisoned. Sadly, farmers have used even more inhumane methods to deal with the elephant incursion problem. In the southwest Indian State of Karnataka, for example, one group of farmers were reported to have fed wild elephants fruits containing low-grade explosives. The explosives ruptured in the elephant's mouths, causing them to die a slow and painful death.

The deaths and injuries to both humans and elephants in the wild elephant border areas have led authorities to try and address these problems as best they can. Usually the solution is to simply kill the small number of elephants that are viewed by the local farmers as presenting the greatest threat. In March of 2003, two Asian elephants near Sootea in the state of Assam were put to death by an elephant hunter hired by the state government after a rampage in which the elephants killed 12 people. Such elephant hunts may result in very cruel treatment toward elephants. In addition, there is evidence that such killings provide no solution, since the vacuum left by the death of one or a few elephants in an area is quickly filled by other elephants. A long-term solution cannot be achieved by culling a few elephants from a herd as the forces that cause the problem act upon the herd as a whole.

India and other countries with wild elephant populations have attempted to protect the elephant herds by establishing a system of elephant sanctuaries and reserves. These sanctuaries and reserves, however, are typically rather small, and are highly fragmented across a wide area. Elephants by nature tend to roam over a wide range, and thus confinement of the animals into a small reserve is difficult, greatly increasing the likelihood of disastrous contact between wild elephant and human populations. One potential solution to this problem currently being explored by elephant experts is the creation of "corridors" of safe passage between reserves. In principle, elephants could travel between reserves in different areas by passing through these narrow corridors, giving each elephant herd a range that is effectively larger than isolated reserves can provide. In order to be effective, however, it would be necessary to somehow prevent elephants passing through these narrow corridors from moving into human populated areas situated along the corridor.

The problem then is how to contain the elephants. Due to their great size and strength, simple fences are a generally ineffective solution to preventing elephant ingress into an area. The principal current method employed for blocking the passage of wild elephants into a populated area involves the digging of trenches. This can be effective in certain terrains and for limited periods of time, but a trench must be quite wide and deep in order to prevent an elephant from crossing. Such trenches are expensive to dig in the first place, and are expensive to maintain since erosion and other natural forces tend to fill in any man-made trenches. As erosion takes place, an elephant may be encouraged to attempt a crossing that may in fact be dangerous, possibly resulting in injury to the elephant. In any event, as the trench fills the elephants will eventually be able to cross if proper maintenance is not performed. Trenches are thus at best a partial solution in certain areas for the prevention of elephant ingress into a human populated area.

While it is possible to construct heavily reinforced, electrified fencing that will restrain elephants, the employment of such fencing over a significant expanse is not practical due to the high cost of such fencing. Solar-powered fences are increasingly being used and, like trenches, are effective in certain regions. But also like trenches, solar-powered fences require constant maintenance. In addition, elephants are capable of detecting regions of weaker voltage in electrified fencing, thus reducing the effectiveness of such fencing if a constant voltage cannot be maintained.

While heretofore no known mechanical methods have been employed to prevent elephant ingress into an area, there are numerous mechanical devices that have been constructed to stop the movement of smaller animals, usually domesticated animals such as cattle, horses, and swine. In particular, many types of so-called "cattle guards" have been in use since the 1800's throughout the world. The purpose of a cattle guard is to prevent animals from stepping through openings in fences, such as where a railroad line or roadway passes through the fence. The cattle guard is permanently placed in the opening, usually over a trench or other opening in the ground. The use of a cattle guard eliminates the requirement of placing a gate to block the passage. Gates are costly, and may be impractical in some situations, such as when the cattle guard is used at a railroad line passage. Since the movement of cattle is easily blocked by a relatively simple and cheap barbed-wire fence, cattle guard devices are only used in those locations (such as roadways and railroad lines) where fencing cannot be placed.

The typical cattle guard is simply a slatted walkway placed over a shallow trench. The slats are spaced such that a cow will be reluctant to tread on the device for fear of a foot passing through one of the spaces between the slats. Cattle, along with other hoofed animals such as pigs and horses, have a natural fear of treading on such spaces. Thus a simple and effective cattle guard can be constructed at nominal cost to block ingress or egress of such animals.

The prior art does include, however, more complex cattle guard devices, particularly for use across railroad lines. U.S. Pat. No. 848,374 to Jenks teaches a cattle guard for use at railway crossings that comprises a metal frame within which are fitted tube-shaped rollers. If an animal steps upon the guard, the rollers turn, drawing the animal's hoof toward the gaps between the rollers. The turning of the roller toward the gap serves to discourage the animal from treading on the device. The cattle guard is constructed in modular form, with pieces that may be fitted together to cover a desired area of track. One particular design objective in this device was to eliminate projecting parts, which might injure persons passing over the guard, or catch on train cars as a train passes over the guard.

U.S. Pat. No. 1,406,343 to Carden teaches a cattle guard similar to the Jenks '374 device, but in place of the cylindrical rollers of Carden '343 the device of Jenks '374 substitutes rollers of a frusto-conical shape. These rollers are placed in the metal frame in an alternating pattern. The inventor asserts that this arrangement results in an unusually effective moving surface for the prevention of cattle ingress and egress.

U.S. Pat. No. 1,618,555 to Shaw teaches a railroad cattle guard of still another design. In place of cylindrical or frusto-conical rollers, Shaw '555 teaches the use of rotating hollow shafts to which blunted spiral blades are attached. The spiral blade is fitted along the shaft in a helical, auger-like fashion. The inventor asserts that when a cow or other hoofed animal steps upon the device, the rotation of the shaft upon which weight is placed will, due to the shape of the spiral blade, push the animal's foot both in a forward or backward direction, and in a sideward direction, which serves to discourage the animal from crossing.

The prior art directed to the prevention of ingress and egress by hoofed animals, particularly cattle, is inapplicable to the problem of preventing elephant incursion into human populated areas. The anatomy of an elephant's foot is quite different from that of cattle, horses, swine, and other hoofed animals for which the prior art "cattle guard" devices were designed. Elephants have toes rather than hooves, with the toes encased in a thick layer of fatty, fibrous tissue. It is this layer of spongy, protective material that allows an elephant to walk so delicately and silently across all sorts of terrain despite its great bulk. The elephant's foot has far greater sensitivity than that of any hoofed animal due to this arrangement, allowing the elephant to feel the surface over which It walks. In addition, elephants are far more intelligent than cattle or horses, and are particularly adept at problem solving. Thus a typical slatted cattle guard would present no obstacle whatsoever to an elephant's passage.

The prior art roller-type cattle guards would also be ineffective against elephants. Elephants are, like most other animals, reluctant to step on a surface that moves when their weight is applied. Each of the prior art cattle guard devices, however, include a frame that surrounds and supports the rollers. Experiments conducted by the inventor hereof indicate that elephants presented with such a simple device may bypass the roller portion of the guard by walking down the framed edge section. When multiple guards are placed side by side, as would be necessary in any practical application to form a barrier to block elephant passage from a protected area, the area in which an elephant may comfortably place its foot is effectively doubled because the two frame edges are butted together. Such an arrangement is a wholly ineffective obstacle In the face of an elephant's superior problem-solving abilities. An attempt to construct a thinner frame would result in a device that would be crushed by the elephant's weight, again allowing the elephant to pass over without difficulty. In addition, an elephant may be able to crush the axle/bushing arrangement at the edge of such a frame, thereby rendering the rotation of the rollers ineffective and allowing the elephant to easily step across.

It may also be seen that since prior art cattle guards are designed to allow humans, vehicles, trains, and the like to pass, while blocking cattle and other hoofed animals, there are important limitations on their design. Such devices could not, for example, include elements that would catch on passing vehicles or trains, tear the tires of vehicles passing over, or present a risk of injury to humans attempting to tread across. A device to address the problem of preventing elephant incursion into populated areas, however, need not be capable of supporting the passage of vehicles, trains, or the like. Instead, a device is needed that can simply be laid down to form a border over which elephants cannot cross. The needed device would thus be more analogous to a fence than a cattle guard in application. As a result, the possible design features that may be applied in a device to solve this problem need not be limited in the same fashion as cattle guard designs, and may in fact, in some embodiments, include elements that would block the passage of both elephants and humans. The device should preferably, however, be portable so that the exact location of the desired elephant barrier may be moved as needed from time to time.

In summary, it may be seen that prior art methods to stop ingress and egress of hoofed, domesticated animals are wholly inadequate to address the problem of preventing elephants from entering populated areas near wild elephant habitat. What is desired is a simple, effective means to prevent wild elephants from encroaching into populated areas, which is preferably inexpensive and simple to construct using mostly used or salvage materials widely available in those areas of the world where wild elephant populations remain. The present invention overcomes the limitations of the prior art devices and addresses the unique characteristics and abilities of the wild elephant in order to develop a practical and effective elephant incursion prevention apparatus as described below.

BRIEF SUMMARY OF THE INVENTION

The present invention is directed to an apparatus comprising one or more modular and mobile units that may be used to protect both wild elephants and the humans who live near wild elephant populations by preventing elephant incursion into the human populated areas. In particular, the device may be used to prevent wild elephants from entering areas of human population in search of food and water. The present invention is specifically designed in response to the unique physiology and problem-solving capabilities of the elephant. The inventor hereof has tested the present invention with elephants maintained on an elephant sanctuary located in the United States. This sanctuary provides a home for unwanted elephants formerly kept by zoos and circuses. Because of their long years of interaction with humans, and in particular their exposure to all sorts of machinery and mechanical devices, these elephants likely have less trepidation concerning mechanical devices than wild elephants. The inventor hereof therefore believes that any device capable of preventing the ingress and egress of these elephants will be even more effective in limiting the travel of wild elephants.

The present invention comprises a heavy frame fitted with a series of rollers. The rollers are designed to turn when an elephant places his weight upon them. The present invention further comprises a guard placed along the lateral edges of the frame to prevent an elephant from using the edges of the frame as a means to bypass the rollers. The guard is preferably of such a shape as to "pinch" the elephant's foot when weight Is applied. The inventor has discovered that an elephant has a natural fear of placing its foot into an area where it may be pinched, and the high degree of sensitivity in the elephant's foot enhances the effectiveness of this technique. The elephant encountering this guard will draw its foot back upon touch, thereby preventing the elephant from passing over the various embodiments of the present Invention. The guard is specifically designed to prevent any injury to the elephant or any possibility of trapping the elephant's foot. The guard will also prevent the elephant from crushing the rollers at the point where they are attached to the frame, thereby rendering it impossible for the elephant to disable the roller motion of the device in this manner and thereby pass over the device.

The present invention also comprises various embodiments of the invention with additional features to further discourage passage by elephants. In one embodiment, the rollers include blunt, smooth triangular flanges protruding along their length. Experiments conducted by the inventor hereof have shown that these flanges serve to further discourage elephants from treading upon the rollers, without causing injury to the elephant's sensitive feet. In another embodiment, the present invention may include means for dispensing natural repellents and deterrent compounds that repel elephants. In still another embodiment, the present invention may include an electrical conductor that provides a mild shock to an elephant whose foot or trunk touches the conductor.

The present invention is designed to be easily transported by towing behind a vehicle or a trained elephant, and is thus both mobile and reusable. In the preferred embodiment of the present invention, rails forming part of the frame may be used as towing skids for this purpose. Attachment loops may be included for connection to towing chains or ropes. In addition, attachment loops may be used to chain multiple units of the present invention together to form a barrier of any desired length.

It is therefore an object of the present invention to provide for a device to prevent the incursion by elephants into a human populated area without injuring elephants who encounter the device.

It is a further object of the present invention to provide for a device that may be laid together in various configurations to block an area of any perimeter shape or size from elephant ingress or egress.

It is a further object of the present invention to provide for a device to prevent incursion by elephants that may be constructed simply and inexpensively, at least partially from used or salvage materials commonly found in areas of the world where wild elephant populations exist.

It is a further object of the present invention to provide for a device to prevent incursion by elephants that is easily portable, and may be easily towed behind a vehicle or trained elephants for placement and movement as desired.

It is a further object of the present invention to provide for a device to prevent incursion by elephants with a guard to prevent elephants from, circumventing rollers incorporated into the device and to prevent elephants from crushing the rollers or the roller mounting means.

It is a further object of the present invention to provide for a device to prevent incursion by elephants that may incorporate one or more specific mixtures of biologically meaningful chemicals into one or more rollers that serve the dual purposes of warning elephants and also as a direct deterrent.

It is a further object of the present invention to provide for a device to prevent incursion by elephants that may incorporate multiple methods to prevent elephant incursion, comprising one or more of rollers, flanged rollers, and electrified conductors.

These and other features, objects and advantages of the present invention will become better understood from a consideration of the following detailed description of the preferred embodiments and appended claims in conjunction with the drawings as described following:

DETAILED DESCRIPTION OF THE INVENTION

With reference to FIGS. 1–4, one unit of the preferred embodiment of the present invention may be described. The preferred embodiment comprises one or more interconnected units 8. Lower side rails 10 of each unit 8 are preferably formed of standard gauge railroad rail, five and one-half inches in height, five and one-half inches wide at the base, and three inches wide at the top. Lower side rails 10 are preferably cut to a length of about seven feet. The upper section of lower side rails 10 is cut away at each end, preferably removing approximately six inches of material at each end of lower side rails 10. Lower side rail ends 12 are formed by bending the remaining portion of each end of lower side rails 10 upward at a slight angle. It will be seen that lower side rails 10 and lower side rail ends 12 effectively form a skid plate by which unit 8 may be pulled along the ground, with the curvature of lower side rail ends 12 preventing unit 8 from digging into loose soil or hanging on rocks, roots, or other projections during transport.

Lateral supports 14 connect two lower side rails 10 and form a supportive frame for each unit 8 thereby. Lateral supports 14 are preferably formed of two three-inch by four-inch beams of one-quarter inch angle iron. Lateral supports 14 are preferably of sufficient length to give unit 8 an overall end-to-end length of approximately ten to ten and one-half feet. Lateral supports 14 are preferably welded between lower side rails 10 at right angles with lower side rails 10.

Figure 1:
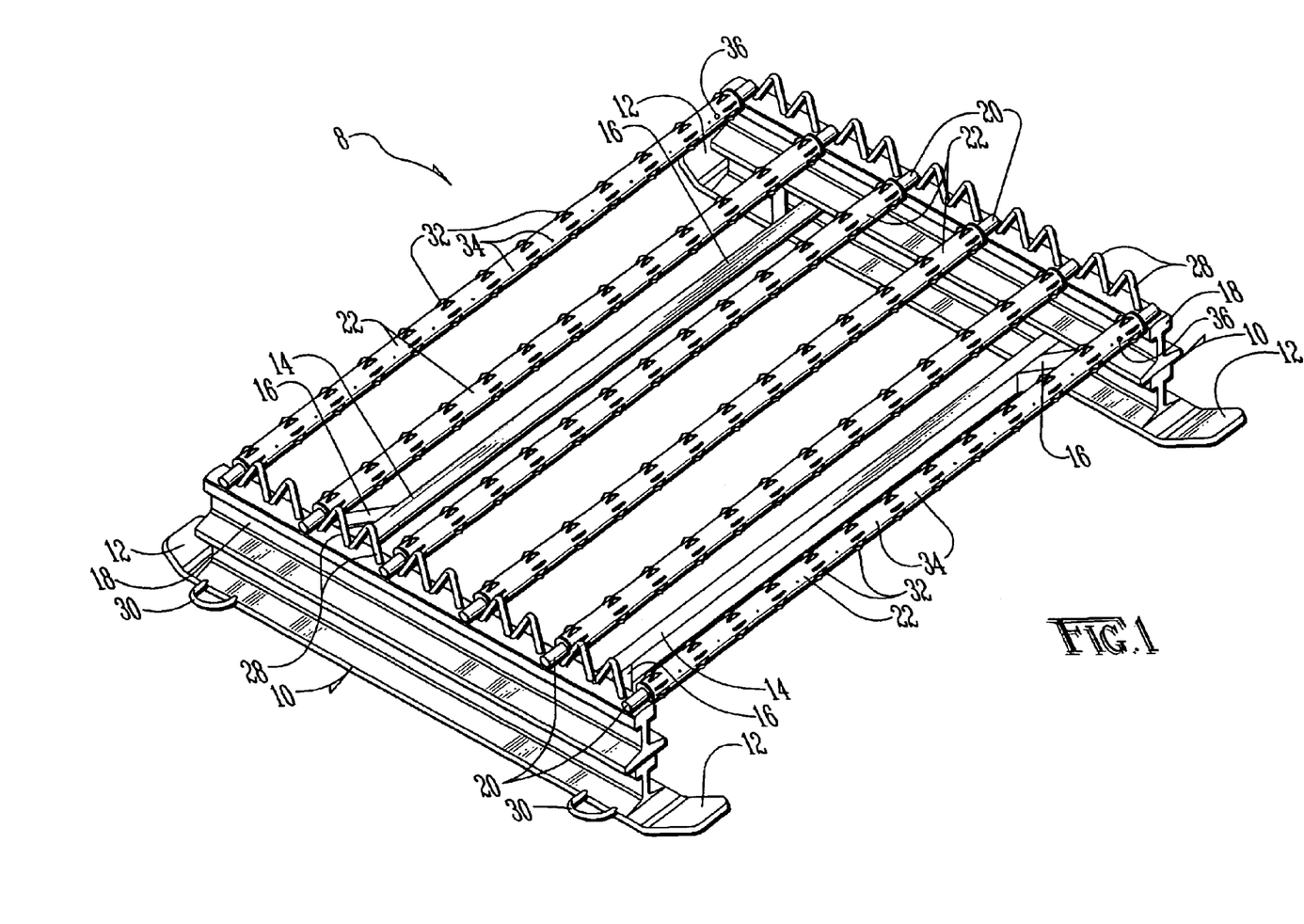
FIG. 1 is a perspective view of one unit of a preferred embodiment of the present invention.
Figure 2:
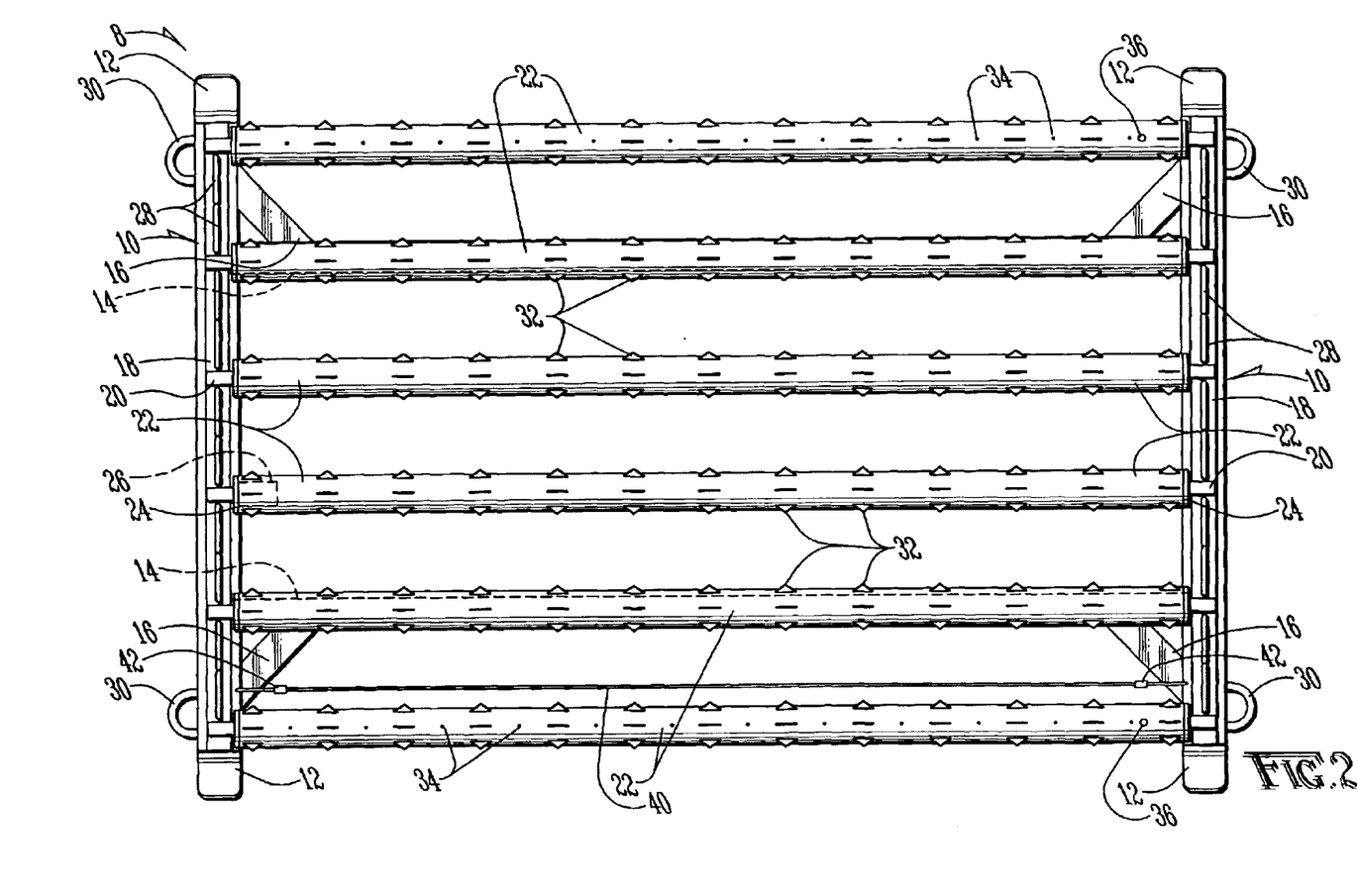
FIG. 2 is a top plan view of one unit of a preferred embodiment of the present invention.

Four diagonal supports 16 are fitted at forty-five degree angles near the joints of each lateral support 14 and lower side rail 10 as shown in FIG. 2. Like lateral supports 14, diagonal supports 16 are preferably formed of three-inch by four-inch pieces of one-quarter inch angle iron. Diagonal supports 16 are welded diagonally between lateral supports 14 and lower side rails 10, preferably at the outside edges of lateral supports 14. Diagonal supports 16 are preferably mitered at their ends to provide a smooth assembly joint at lateral supports 14 and lower side rails 10. The cross-bracing provided by diagonal supports 16 strengthens the joint between lateral supports 14 and lower side rails 10, and thereby strengthens the resulting frame provided for unit 8.

Figure 4:
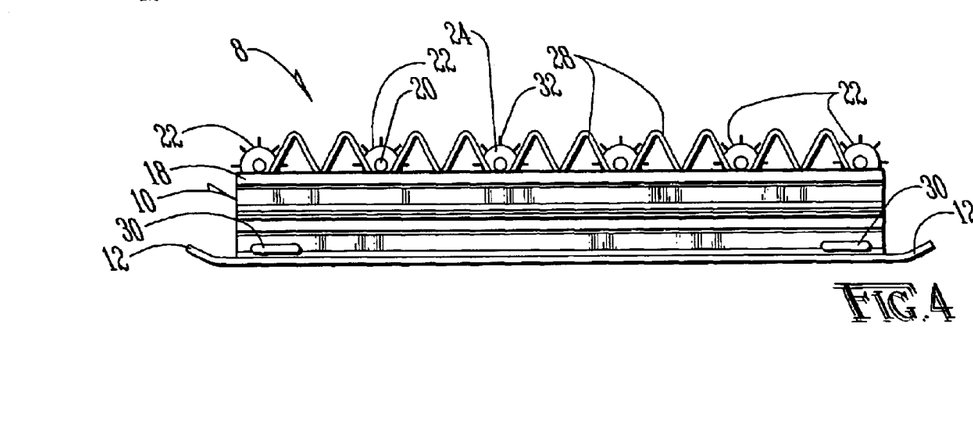
FIG. 4 Is an end elevational view of one unit of a preferred embodiment of the present invention.

Upper side rails 18 are preferably welded on top of lower side rails 10 in a lengthwise fashion as shown in FIG. 4. Upper side rails 18 are preferably about six feet in length and centered on top of lower side rails 10, such that lower side rail ends 12 extend past the ends of upper side rails 18 in both directions.

Figure 3:
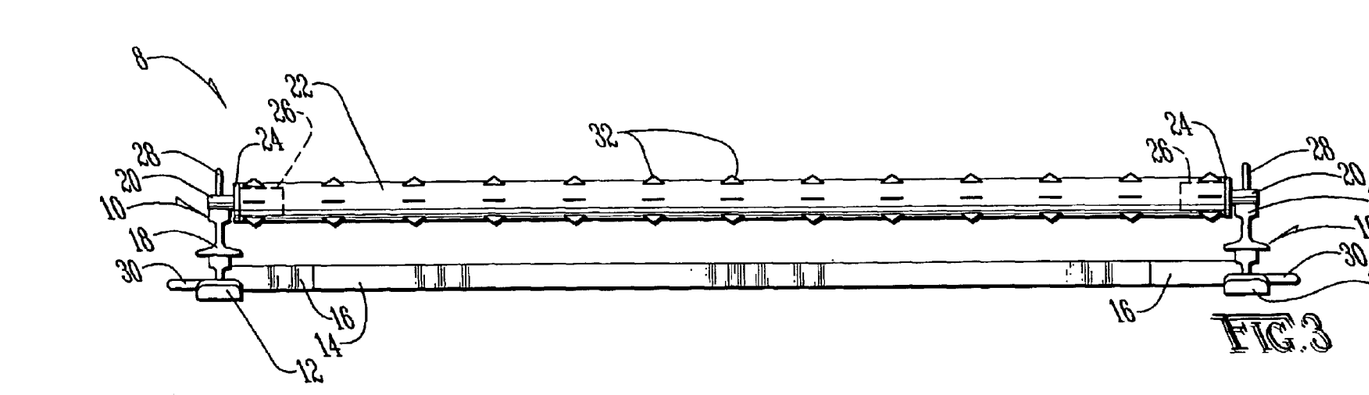
FIG. 3 is a side elevational view of one unit of a preferred embodiment of the present invention.

A series of axles 20 provide rotational support for rollers 22 as shown in FIGS. 2 and 3. Axles 20 are preferably formed of one-inch diameter steel rod, and rollers 22 are preferably formed of steel pipe with an outside diameter of four and one-half inches. Rollers 22 are preferably of a length of about ten feet to fit between upper side rails 18. Bushings 26 are preferably welded or otherwise attached to the top of upper side rails 18 in such a manner as to provide spacing between each of rollers 22 in an amount of approximately ten and one-half inches. In the preferred embodiment, this means that each unit 8 would consist of six sets of axles 20 and rollers 22 fitted onto a pair of bushings 26. It has been determined that a unit 8 according to the preferred embodiment with six rollers 22 is sufficiently broad to prevent elephant crossing. Alterative embodiments, however, may consist of any number of axles 20 and rollers 22 as desired for a particular application. It should be noted that while rollers 22 are cylindrical in shape in the preferred embodiment, any other shape (including without limitation frusto-conical) could be adopted so long as rollers 22 are capable of moving in response to the application of the weight of an elephant's foot.

Bushing 26 provide the means by which each roller 22 and corresponding axle 20 rotate with respect to upper side rails 18, as shown in FIGS. 2 and 3. An end cap 24 is welded to each end of each roller 22; each end cap 24 preferably consists of a piece of steel sheet one-half inch thick and four and one-half inches in diameter. Bushing 26 preferably is formed of a piece of steel pipe having an outside diameter of one and five-sixteenth inches and a length of three inches. Bushing 26 extends within roller 22 sufficiently far to provide support for roller 22. Standard automotive grease is packed between the outer surface of bushing 26 and the inner surface of roller 22 such that roller 22 will rotate freely on bushing 26 when touched. A grease fitting (not shown) may in alternative embodiments be fitted near the end of bushing 26 for this purpose.

Construction of roller 22 and the associated parts of unit 8 may thus proceed as follows. Two endcaps 24 are welded to a roller 22. An axle 20 is fed through roller 22. A bushing 26 is welded in place on one of the upper side rails 18. One end of axle 20 is fed through bushing 26, the second bushing 26 is fitted onto the opposite end of axle 20, and the second bushing 26 is then welded into place on the opposite upper side rail 18. It may be noted that the elimination of roller bearings and like elements that may be found in precision applications where rollers are employed reduces the maintenance required on unit 8, and thereby greatly improves its utility in the relatively hot, moist weather conditions as are typically encountered where wild elephant populations still exist.

Guards 28 are welded on top of upper side rails 18, as shown in FIG. 4, in such a manner as to protect the ends of rollers 22 and axles 20 and to prevent elephants from walking along upper side rails 18 in order to defeat the purposes of the present invention. Guards 28 are preferably formed of pieces of three-eighths inch thick rebar, cut to ten and one-half inch lengths and bent into a "V" shape, the base of which is roughly six inches in length. A series of guards 28 may then be welded to upper side rails 18 with the pointed portion of the "V" shape directed upwards. In the preferred embodiment, two guards 28 are fitted between the crossings of each axle 20 on upper side rails 18, such that there are ten guards 28 per upper side rail 18. While this arrangement appears to achieve the desired objectives based on testing, other arrangements of guards 28 may be employed in alternative embodiments of the invention provided that guards 28 effectively prevent elephants from treading on upper side rail 18.

As shown in FIG. 2, the preferred embodiment further includes attachment loops 30 welded to each lower side rail 10, such that each unit 8 has four attachment loops 30. Attachment loops 30 are preferably formed from one-inch diameter round steel stock, bent into a "U" shape and welded to the outside portion of lower side rail 10 at each of the ends of attachment loop 30. Preferably, attachment loops 30 are welded to each lower side rail 10 near each of the two ends of lower side rail 10. Attachment loops 30 preferably form a D-shaped opening of approximately four inches in diameter. Attachment loops 30 may be used for pulling unit 8 for purposes of transport and for connecting multiple segments 8 for form a barrier of a desired length.

Now that certain basic construction elements of the preferred embodiment has been described, other optional elements of the preferred embodiment may be presented. The present invention may be practiced without any of these optional elements, or may be employed with any combination of one or more of these optional elements as desired based upon the particular application. As shown in FIGS. 2 and 3, rollers 22 may include rows of blunt flanges 32 extending radially outward from the surface of rollers 22. In the preferred embodiment, flanges 32 are formed of one-quarter-inch flat steel stock in the shape of a flattened triangle, two and three-quarters inches wide at its base and one inch in height. Flanges 32 provide an additional disincentive to elephants attempting to step across unit 8. Flanges 32 should not be sharpened to a fine point in order to avoid injury to an elephant attempting to cross a barrier formed by one or more segments 8. It should be noted that an alternative embodiment of the present invention without flanges 32 has been tested and also found effective at preventing elephants from crossing a barrier of segments 8.

The preferred embodiment also optionally includes a means for dispersing chemical repellents as shown in FIG. 2. Certain natural product mixtures, enhanced with specific chemical compounds, serve to repel elephants without causing harm to the animals. These natural product compounds include rotten bovine flesh and entrails, aged egg compounds, and tomato leaf extracts. The effectiveness of these mixtures may be enhanced with ketones identified and quantified from secretions of male elephants. One particular preferred mixture is composed of 2-undecanone and 2-nonanone added to one of the three basic mixtures. A second preferred formulation is composed of triethyl-2-cyclohexen-1-ol, 2-undercanone, cyclopentanone and 2-nonanone. The matrix of natural products serves to prolong the lifetime of the chemicals. Certain of rollers 22, preferably those on the outside of unit 8, may comprise holes 34 for the dispersal of liquid chemical repellent. The holes are preferably one-sixteenth inch in diameter, or such other size as to allow the chemical to be dispensed such that it can be sensed by elephants, while preventing the chemical liquid repellent within roller 22 from simply spilling onto the ground. A larger filling hole 36 may be placed into roller 22 for the introduction of liquid chemical repellents. In the preferred embodiment, filling hole 36 may be one-half inch in diameter. A pipe plug 38 (not shown) may be threaded into filling hole 36 to prevent leakage.

Finally, unit 8 may be fitted with a conductor such that a mild electric shock may be applied to an elephant touching unit 8, providing further disincentive to the crossing of a barrier formed of units 8. As shown in FIG. 2, conducting wire 40 is stretched between one end of upper side rails 18 near a roller 22. Conducting wire 40 is preferably formed of a standard wire used in electric fencing applications, preferably sixteen-gauge electric fence wire. Conducting wire 40 is supported at either end by porcelain insulators 42. Conducting wire 42 may be connected to a source of electrical current in the standard method used for electric fencing applications as is well known in the art.

Figure 5:
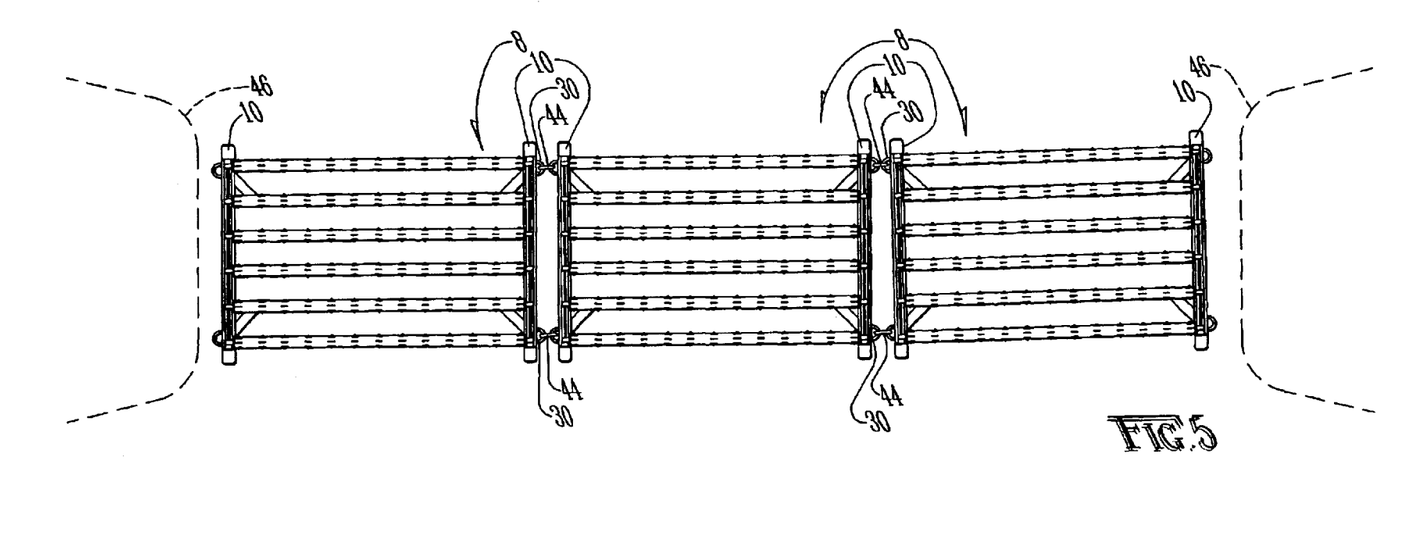
FIG. 5 is a top plan view of a deployment of multiple units of a preferred embodiment of the present invention.

Having described the construction of a unit 8 of a preferred embodiment of the invention, the use of the preferred embodiment in the prevention of elephant incursions into areas of human population may now be described. The border between the areas of human habitation and the elephant refuge must first be precisely ascertained. Of particular concern will be any areas where the elephant refuge area is of relatively narrow width, such as in the elephant "corridors" proposed in some regions that will allow elephants to travel from one refuge to another. Any natural barriers to elephant travel along these borders need not be protected. In the areas where elephants are most likely to cross into human habitation areas, however, segments 8 may be placed as needed. Segments 8 may be constructed and pulled to the desired location by truck or other vehicle, or by the use of trained elephants, using a chain attached between the vehicle or elephant and one or more attachment loops 30. Preferably, two attachment loops 30 are attached behind the vehicle such that unit 8 skids along an axis parallel with the axis of lower side rails 10, with lower side rail ends 12 pointed to the front and rear during transport. Once in position, a barrier may be formed by chaining or otherwise connecting segments 8 together end-to-end at attachment loops 30 with chains 44, as shown in FIG. 5. Natural barrier 46, such as dense trees, cliffs, or the like, flank the barrier formed by segments 8 in FIG. 5. If desired, rows of segments 8 may be placed adjacent to one another to form a deeper barrier to elephant incursion in areas of particular concern.

Referring again to FIGS. 1 and 2, the reaction of an elephant attempting to cross a barrier formed of segments 8 as shown in FIG. 5 may now be described. Elephants have a natural fear of placing their feet on a moving surface. An elephant who applied weight on a foot touching rollers 22 would likely draw its foot back once roller 22 began turning in response to the weight. In the embodiment incorporating flanges 32, the elephant would also experience discomfort at its toes upon applying pressure downward on a flange 32, further discouraging the elephant from attempting to walk across unit 8. Chemical repellent from repellent holes 34 in certain alternative embodiments of the present invention might serve to dissuade an elephant from approaching such a barrier, or at the least would increase the elephant's trepidation upon attempting to cross a barrier formed of segments 8. In addition, if segments 8 are deployed with conducting wire 40 such that conducting wire 40 is placed along the edge of segments 8 nearest the elephant, the elephant will also experience discomfort from the electric shock upon placing its foot down or touching its trunk to wire 40, further discouraging the elephant from attempting to cross unit 8.

As already noted, elephants are highly intelligent animals, and tests have shown that elephants presented with a row of segments 8 lashed together to form a barrier will discern that they may be able to walk across the path formed by two upper side rails 18 butted together at the junction of each unit 8. Even if the elephant is unable to cross the barrier so formed, the simple placement of a substantial amount of an elephant's weight onto an upper side rail 18 may be sufficient to destroy an axle 20 on roller 22, thereby comprising the effectiveness of the barrier. Guards 28 serve to "pinch" the foot of an elephant attempting to cross at upper side rails 18, thereby discouraging the elephant from placing significant weight downward on upper side rails 18 and protecting axles 20. Because the elephant's foot will naturally slide downward toward the gap between guards 28 during such an attempt, it is important that guards 28 be designed such that no protrusions exist between guards 28 that could catch the elephant's foot and trap it in the barrier. The elephant must be able to withdraw its foot from between guards 28 once it experiences discomfort and before any injury occurs.

It should be noted that the entire preferred embodiment of the present invention, as herein described, may be constructed of materials commonly available in relatively remote, third-world areas where wild elephant habitats are still found. The only materials required for construction are standard railroad rails, steel pipe, used oil drill stem if available, steel rod, angle iron, rebar, sheet steel stock, and round steel stock. The preferred embodiment may be assembled from these raw materials with nothing more than basic welding and drilling equipment. This feature of the preferred embodiment allows the device to be constructed in the field by relatively unskilled workers. Funds available for the protection of wild elephants are quite limited, particularly since the bulk of these funds are made available from the governments of countries with a standard of living far below that found in the United States and most western countries. If the device required construction at a remote or overseas location, the cost of transporting the device to the areas where needed would greatly hamper the ability to deploy the device in sufficient quantities to protect the wild elephant populations.

The preferred embodiment described herein has been extensively tested on captive elephants at an elephant sanctuary in the United States. Both African and Asian elephants were exposed to the preferred embodiment in these tests. The device has been found to be effective in preventing elephant incursion. It should be noted that the elephants employed in these tests are those that have lived in close proximity to humans for many years, and have been trained to perform the standard sorts of feats seen in circuses and zoos. These elephants are therefore more comfortable than wild elephants would be in the presence of human construction and machinery, and are adept at performing subtle movements as would be helpful to defeat incursion prevention devices. In addition, many of the elephants in this sanctuary were rejected by circuses and zoos due to aggressive behavior. For all of these reasons, the elephants exposed to the preferred embodiment during these tests would appear more likely to attempt such a crossing than wild elephants, and it is therefore believed that the effectiveness of the preferred embodiment in preventing crossing by the sanctuary elephants demonstrates its effectiveness with respect to the protection of wild elephants.

It should be noted that while the invention has been described herein for use with elephants, the invention is not so limited, and may conceivably be used to prevent incursion by any large animal with a sufficiently sensitive foot that the device will function to prevent incursion by such animal. It is believed that such animals include but are not necessarily limited to the rhinoceros and the hippopotamus.

The present invention has been described with reference to certain preferred and alternative embodiments that are intended to be exemplary only and not limiting to the full scope of the present invention as set forth in the appended claims.

What is claimed is:

1. A large animal intrusion prevention apparatus, comprising:
   (a) a frame comprising at least one side;
   (b) at least one roller mounted with respect to said frame wherein said roller turns in response to weight applied to its surface; and
   (c) a foot pinching means attached to said side, wherein said foot pinching means functions to pinch the foot of the animal attempting to step on said side extending vertically above the plane of the frame.

2. The apparatus of claim 1, wherein said foot pinching means comprises a plurality of projections dispersed lengthwise along said side.

3. The apparatus of claim 2, wherein said projections are formed of a length of annular material bent into an inverted V shape.

4. The apparatus of claim 2, wherein said projections are triangular.

5. The apparatus of claim 2, further comprising a plurality of protrusions attached to said roller.

6. The apparatus of claim 5, wherein said protrusions are triangular flanges.

7. The apparatus of claim 2, further comprising at least one attachment loop connected to said frame.

8. The apparatus of claim 7, wherein said at least one side comprises a skidding surface and at least one upturned skid surface side end.

9. The apparatus of claim 2, further comprising a repellent dispersant.

10. The apparatus of claim 9, wherein said repellent dispersant comprises repellent dispersal openings in said roller sized to permit the dispersal of chemical repellent.

11. The apparatus of claim 2, further comprising at least one electrical conductor wire attached adjacent to said frame.

12. The apparatus of claim 1 comprising a chemical repellent and a repellent dispersant, wherein said chemical repellent comprises (a) at least one of rotten animal flesh, rotten animal entrails, aged egg compounds, and a tomato leaf extract; and (b) a ketone.

13. The apparatus of claim 12, wherein said repellent comprises 2-undecanone and 2-nonanone.

14. The apparatus of claim 13, wherein said repellent further comprises triethyl-2-cyclohexen-1-ol and cyclopentanone.

15. A large animal incursion prevention apparatus, comprising:
   (a) a frame comprising two sides;
   (b) a plurality of axles attached at said two sides, said axles disposed orthogonally to said two sides;
   (c) a plurality of rollers mounted circumferentially on said axles between said two sides, said rollers operable to rotate in response to pressure from the animal's foot, and said rollers spaced one from another sufficiently close together so as to prevent the animal from placing a foot therebetween;
   (d) a foot pinching means attached to each of said two sides, said guard extending upwardly from the upper surface of each of said two sides and said guard shaped so as to pinch the foot of the animal attempting to step onto said side without injuring the animal.

16. The apparatus of claim 15, wherein said foot pinching means is shaped as one of a series of inverted Vs and a series of triangles dispersed lengthwise along said two sides.

17. The apparatus of claim 15, further comprising flanges attached to at least one of said rollers, said flanges extending radially outward from said roller.

18. The apparatus of claim 15, further comprising at least one attachment loop attached to each of said two sides, a skidding surface on the bottom of each of said two sides, and at least one upturned skid surface side end on each of said two sides.

19. The apparatus of claim 15, wherein said roller further comprises repellent dispersal openings.

20. The apparatus of claim 15, further comprising an electrical conductor wire attached across said sides parallel to said rollers and adjacent to one of said rollers, and an electrical current source in conductive contact with said electrical conductor wire.

21. The apparatus of claim 15, wherein said sides comprise railroad rails and said rollers comprise steel pipe.

22. A large animal incursion prevention apparatus comprising a plurality of units, each said unit comprising a frame, a plurality of rollers mounted circumferentially across said frame, and a foot pinching means attached to said frame extending vertically above the plane of the frame, wherein said units are joined together to form a barrier.

23. The apparatus of claim 22, wherein said units further comprise attachment loops attached to said frame of said units, and wherein said units are connected together at said attachment loops.

* * * * *